United States Patent [19]

Dalla Betta et al.

[11] Patent Number: 5,326,253
[45] Date of Patent: Jul. 5, 1994

[54] PARTIAL COMBUSTION PROCESS AND A CATALYST STRUCTURE FOR USE IN THE PROCESS

[75] Inventors: Ralph A. Dalla Betta, Mountain View; Toru Shoji, Sunnyvale, both of Calif.; Kazunori Tsurumi, Fujisawa; Nobuyasu Ezawa, Koto, both of Japan

[73] Assignees: Catalytica, Inc., Mountain View, Calif.; Tanaka Kikinzoku Kogyo K.K., Japan

[21] Appl. No.: 617,975

[22] Filed: Nov. 26, 1990

[51] Int. Cl.$^5$ .................................. F23D 21/00
[52] U.S. Cl. .............................. 431/7; 502/339
[58] Field of Search .............. 431/7, 170, 328; 60/723; 422/170, 171; 48/127.7; 502/339; 423/213.5

[56] References Cited

U.S. PATENT DOCUMENTS

| | | | |
|---|---|---|---|
| 3,970,435 | 7/1976 | Schultz et al. | 48/61 |
| 4,019,969 | 4/1977 | Golebiowski et al. | 204/26 |
| 4,270,896 | 6/1981 | Polinski et al. | |
| 4,572,904 | 2/1986 | Onal | 423/213.5 X |
| 4,603,547 | 8/1986 | Pfefferle et al. | |
| 4,870,824 | 10/1989 | Young et al. | 431/328 X |
| 4,893,465 | 1/1990 | Farrauto et al. | 60/723 |
| 5,026,611 | 6/1991 | Usui et al. | 502/527 X |

FOREIGN PATENT DOCUMENTS

| | | | |
|---|---|---|---|
| 1107517 | of 0000 | Canada | |
| 0356197A1 | of 0000 | European Pat. Off. | |
| 0370244A1 | of 0000 | European Pat. Off. | |
| 198948 | 10/1986 | European Pat. Off. | 431/7 |
| 2382584 | of 0000 | France | |
| 60-026211 | 2/1985 | Japan | |
| 60-060411 | 4/1985 | Japan | |
| 60-175925 | 9/1985 | Japan | |
| 60-196511 | 10/1985 | Japan | |
| 60-202745 | 10/1985 | Japan | |
| 60-205115 | 10/1985 | Japan | |
| 60-205116 | 10/1985 | Japan | |
| 60-222145 | 11/1985 | Japan | |
| 60-238148 | 11/1985 | Japan | |
| 61-033233 | 2/1986 | Japan | |
| 61-038627 | 2/1986 | Japan | |
| 61-147014 | 7/1986 | Japan | |
| 61-235609 | 10/1986 | Japan | |
| 61-237905 | 10/1986 | Japan | |
| 61-252408 | 11/1986 | Japan | |
| 62-041511 | 2/1987 | Japan | |
| 62-046116 | 2/1987 | Japan | |
| 62-049125 | 3/1987 | Japan | |
| 62-079847 | 4/1987 | Japan | |
| 62-084215 | 4/1987 | Japan | |

(List continued on next page.)

OTHER PUBLICATIONS

Pennline, Henry W., Richard R. Schehl, and William P. Haynes, *Operation of a Tube Wall Methanation Reactor*, Ind. Eng. Chem. Process Des. Dev.: vol. 18, No. 1, 1979.

L. Louis Hegedus, "Temperature Excursions in Catalytic Monoliths", *AIChE Journal*, Sep. 1975, vol. 21, No. 5, 849–853.

Kee et al., "The Chemkin Thermodynamic Data Base", *Sandia National Laboratory Report No. SAND87-8215*, 1987.

(List continued on next page.)

*Primary Examiner*—Carl D. Price
*Attorney, Agent, or Firm*—Morrison & Foerster

[57] ABSTRACT

This invention is both a partial combustion process in which the fuel is partially combusted using specific catalysts and catalytic structures and also a catalyst structure for use in the process. The choice of catalysts and supports solves problems in the art dealing with the stability of the overall catalyst structure and ease of catalyst operation. The catalyst structure is stable due to its comparatively low operating temperature, has a low temperature at which catalytic combustion begins, and yet is not susceptible to temperature "runaway". The combustion gas produced by the catalytic process typically is below the autocombustive temperature for the gas mixture; the gas may be used at that temperature, or fed to other combustion stages for ultimate use in a gas turbine, furnace, boiler, or the like.

30 Claims, 9 Drawing Sheets

FOREIGN PATENT DOCUMENTS

| | | |
|---|---|---|
| 62-112910 | 5/1987 | Japan . |
| 62-125210 | 6/1987 | Japan . |
| 62-158910 | 7/1987 | Japan . |
| 62-216642 | 9/1987 | Japan . |
| 62-261803 | 11/1987 | Japan . |
| 63-041720 | 2/1988 | Japan . |
| 63-080847 | 4/1988 | Japan . |
| 63-190644 | 8/1988 | Japan . |
| 63-213723 | 9/1988 | Japan . |
| 63-267804 | 11/1988 | Japan . |
| 01-139911 | 6/1989 | Japan . |
| 01-210707 | 8/1989 | Japan . |
| 01-242151 | 9/1989 | Japan . |
| 02-021117 | 1/1990 | Japan . |
| 02-052930 | 2/1990 | Japan . |
| 02-059045 | 2/1990 | Japan . |
| 02-211255 | 8/1990 | Japan . |
| 02-213607 | 8/1990 | Japan . |
| 2-238206 | 9/1990 | Japan . |
| 02-268830 | 11/1990 | Japan . |

OTHER PUBLICATIONS

Kubaschewski et al., "Metallurgical Thermo-Chemistry", *International Series on Materials Science and Technology*, 5th Edition, vol. 24, 382.

Hayashi et al., "Performance Characteristics of Gas Turbine Combustion Catalyst Under High Pressure", *Gas Turbine Society of Japan*, 1990, 18–69, 55.

PARTIAL COMBUSTION PROCESS AND A CATALYST STRUCTURE FOR USE IN THE PROCESS

FIELD OF THE INVENTION

This invention is both a partial combustion process in which the fuel is partially combusted using specific catalysts and catalytic structures and also a catalyst structure for use in the process. The choice of catalysts and supports solves problems in the art dealing with the stability of the overall catalyst structure and ease of catalyst operation. The catalyst structure is stable due to its comparatively low operating temperature, has a low temperature at which catalytic combustion begins, and yet is not susceptible to temperature "runaway". The combustion gas produced by the catalytic process typically is below the autocombustive temperature for the gas mixture; the gas may be used at that temperature, or fed to other combustion stages for ultimate use in a gas turbine, furnace, boiler, or the like.

BACKGROUND OF THE INVENTION

With the advent of modern antipollution laws in the United States and around the world, significant and new methods of minimizing various pollutants are being investigated. The burning of fuel—be the fuel wood, coal, oil, or a natural gas—likely causes a majority of the pollution problems in existence today. Certain pollutants, such as $SO_2$, are created as the result of the presence of a contaminant in the fuel source and may be removed either by treating the fuel to remove the contaminant or by treating the exhaust gas eventually produced. Other pollutants (such as carbon monoxide) are created as the result of imperfect combustion and may be removed by post-combustion oxidation or by improving the combustion process. The other principal pollutant, $NO_x$ (an equilibrium mixture mostly of NO but also containing very minor amounts of $NO_2$), may be dealt with either by controlling the combustion process to minimize $NO_x$ production or by later removal. Removal of $NO_x$, once produced, is a difficult task because of its relative stability and its low concentration in most exhaust gases. One solution found in automobiles is the use of carbon monoxide chemically to reduce $NO_x$ to nitrogen while oxidizing the carbon monoxide to carbon dioxide. However, in some combustion processes (such as in gas turbines) the carbon monoxide concentration is insufficient to react with and to remove the $NO_x$.

It must be observed that unlike the situation with sulfur pollutants where the sulfur contaminant may be removed from the fuel, removal of nitrogen from the air fed to the combustion process is clearly impractical. Unlike the situation with carbon monoxide, improvement of the combustion reaction would likely increase the level of $NO_x$ produced due to the higher temperatures present in the combustion process.

Nevertheless, the challenge to reduce $NO_x$ remains and several different methods have been suggested. The $NO_x$ abatement process chosen must not substantially conflict with the goal for which the combustion gas was created, i.e., the recovery of its heat value in a turbine, boiler, or furnace.

Many recognize that a fruitful way of controlling $NO_x$ production is to limit the localized and bulk temperatures in the combustion zone to something less than 1800° C. See, for instance, U.S. Pat. No. 4,731,989 to Furuya et al. at column 1, lines 52–59 and U.S. Pat. No. 4,088,135 to Hindin et al. at column 12.

There are a number of ways of controlling the temperature, such as by dilution with excess air, controlled oxidation using one or more catalysts, or staged combustion using variously lean or rich fuel mixtures. Combinations of these methods are also known. One widely attempted method is the use of multi-stage catalytic combustion. Most of these processes utilize multi-section catalysts of metal oxide on ceramic catalyst carriers. Typical of such disclosures are:

TABLE

| Country | Document | 1st Stage | 2nd Stage | 3rd Stage |
|---|---|---|---|---|
| Japan | Kokai 60-205129 | Pt-group/$Al_2O_3$ & $SiO_2$ | La/$SiO_2.Al_2O_3$ | |
| Japan | Kokai 60-147243 | La & Pd & Pt/$Al_2O_3$ | ferrite/$Al_2O_3$ | |
| Japan | Kokai 60-66022 | Pd & Pt/$ZrO_2$ | Ni/$ZrO_2$ | |
| Japan | Kokai 60-60424 | Pd/— | CaO & $Al_2O_3$ & NiO & w/noble metal | |
| Japan | Kokai 60-51545 | Pd/* | Pt/* | $LaCoO_3$/* |
| Japan | Kokai 60-51543 | Pd/* | Pt/* | |
| Japan | Kokai 60-51544 | Pd/* | Pt/* | base metal oxide/* |
| Japan | Kokai 60-54736 | Pd/* | Pt or Pt—Rh or Ni base metal oxide or $LaCO_3$/* | |
| Japan | Kokai 60-202235 | $MoO_4$/— | $CoO_3$ & $ZrO_2$ & noble metal | |
| Japan | Kokai 60-200021 | Pd & $Al_2O_3$/+* | Pd & $Al_2O_3$/** | Pt/** |
| Japan | Kokai 60-147243 | noble metal/heat resistant carrier | ferrite/heat resistant carrier | |
| Japan | Kokai 60-60424 | La or Nd/$Al_2O_3$ 0.5% $SiO_2$ | Pd or Pt/NiO & $Al_2O_3$ & CaO 0.5% SiO | |
| Japan | Kokai 60-14938 | Pd/? | Pt/? | ? |
| Japan | Kokai 60-14939 | Pd & Pt/refractory | ? | |
| Japan | Kokai 61-252409 | Pd & Pt/*** | Pd & Ni/*** | Pd & Pt/*** |
| Japan | Kokai 62-080419 | Pd & Pt | Pd,Pt & NiO | Pt ot Pt & Pd |
| Japan | Kokai 62-080420 | Pd & Pt & NiO | Pt | Pt & Pd |
| Japan | Kokai 63-080848 | Pt & Pd | Pd & Pt & NiO | Pt or Pt & Pd |
| Japan | Kokai 63-080849 | Pd, Pt, NiO/? | Pd & Pt (or NiO)/? | Pt or Pd & Pt/? |

*alumina or zirconia on mullite or cordierite
**Ce in first layer; one or more of Zr, Sr, Ba in second layer; at least one of La and Nd in third layer.
***monolithic support stabilized with lanthanide or alkaline earth metal oxide
Note:
the catalysts in this Table are characterized as "a"/"b" where "a" is the active metal and "b" is the carrier It is, however, difficult to control intermediate or between-stage temperatures in these processes. Since the object of each of the processes is to produce a maximum amount of heat in a form which can be efficiently used in some later process, the combustive steps are essentially adiabatic. Consequently, a minor change in any of fuel rate, air rate, or operating processes in an early stage will cause significant changes in the inter-stage temperatures. Very high temperatures place thermal strain on downstream catalytic elements.

This list also makes clear that platinum group metals (including palladium) are considered useful in catalytic combustion processes. However, conventional catalytic combustion processes often mix the fuel and air and then pass this mixture over a catalyst with essentially complete combustion in the catalyst bed. This results in extremely high temperatures, typically 1100° C. to 1500° C. For this reason, much of the catalyst development work is directed at catalysts and supports that can withstand those high temperatures and yet remain active. Some have relied on process control schemes in which the flow rate of an intermediate stream of air or fuel is introduced between catalyst stages and is controlled based upon bulk gas temperature. Furuya et al. (mentioned above) describes one approach in circumventing the problems associated with a high catalyst temperature through dilution of the fuel/air mixture with air fed to the catalyst so that the resulting mixture has an adiabatic combustion temperature of 900° C. to 1000° C. This mixture is passed through the catalyst and partial or complete reaction gives a maximum catalyst temperature less than 1000° C. and a gas temperature less than 1000° C. Additional fuel is added after the catalyst and homogeneous combustion of this mixture gives the required temperature (1200° C. to 1500° C.). This process, however, suffers from the need to add fuel at two stages and the requirements to mix this additional fuel with hot gases without obtaining a conventional high temperature diffusion flame and the associated production of $NO_x$.

The process of this invention mixes air and fuel at the beginning of the combustor in a ratio such that the final combustion temperature is, after further combustion step(s), that required by some later process or device which recovers the heat from the combustive gas, e.g., a gas turbine. A typical mixture might be methane and air at a volume fuel/volume air ratio of 0.043. Such a mixture (after being preheated to 350° C.) would provide a combustion temperature of about 1300° C. This mixture passes over a catalyst and is only partially combusted with the catalyst limiting the maximum catalyst temperature to less than about the thermogravimetric analysis (TGA) transition temperature of the reaction:

$$Pt_a \rightarrow Pd + \tfrac{1}{2}O_2$$

at the partial pressure of oxygen present during the reaction. As a rule of thumb, this TGA transition temperature is approximately 780° C. to 800° C. in air at one atm and 930° C. to 950° C. in air at ten atm.

The temperature self-controlling feature of this invention takes place by employing one or more of the following:

a. Use of palladium as the active catalytic metal since the active palladium oxide species interconverts to less active palladium metal as the temperature rises to the palladium oxide/palladium TGA transition temperature.

b. Use of a diffusion barrier applied over the catalyst surface to limit the rate at which the fuel diffuses to the catalyst and, therefore, limits the catalytic reaction rate and allows palladium to limit the maximum temperature.

The interconversion of palladium oxide and palladium at approximately 800° C. has been described previously (for example, by Furuya et al. in U.S. Pat. No. 4,731,989). However, this patent describes this interconversion as a disadvantage since the active palladium oxide species is converted to a less active palladium species thus preventing the combustion reaction from going to completion on the catalyst. The inventive process of this patent uses this palladium oxide/palladium interconversion to limit the catalyst temperature and thereby permit the use of high activity yet thermally stable catalysts.

By maintaining the catalyst temperature at or below the palladium oxide/palladium TGA transition temperature, problems associated with thermal sintering of the catalyst, vaporization of the palladium, and thermal shock of the support can be minimized or eliminated.

We strongly prefer to use a monolithic metal support for the palladium-containing catalyst.

The use of metal catalyst supports for platinum group metals has been suggested in passing. See, for instance, U.S. Pat. No. 4,088,435 to Hindin et al., "platinum group metals" at column 4, lines 63 et seq., and "the support may be metallic or ceramic . . . " at column 6, line 45. Conversely, the use of a platinum group alloy monolithic catalyst as a combustion catalyst is suggested in U.S. Pat. No. 4,287,856 to Enga at column 1, line 65 et al. Other similar disclosures are found in the earlier U.S. Pat. Nos. 3,966,391; 3,956,188; 4,008,037; and 4,021,185 all to Hindin et al. Platinum on a steel ("Fecralloy") support as a combustion catalyst for low heating value gas is suggested in U.S. Pat. No. 4,366,668 to Madgavkar et al.

Other disclosures of metals and metal supports used mainly for automotive catalytic converters include:

| Country | Document | Patentee |
|---|---|---|
| U.S. | 3,920,583 | Pugh |
| U.S. | 3,969,082 | Cairns et al. |
| U.S. | 4,279,782 | Chapman et al. |
| U.S. | 4,318,828 | Chapman |
| U.S. | 4,331,631 | Chapman et al. |
| U.S. | 4,414,023 | Aggen et al. |
| U.S. | 4,521,532 | Cho |
| U.S. | 4,601,999 | Retallick et al. |
| U.S. | 4,673,663 | Magnier |
| U.S. | 4,742,038 | Matsumoto |
| U.S. | 4,752,599 | Nakamura et al. |
| U.S. | 4,784,984 | Yamanaka et al. |
| Great Britain | 1,528,455 | Cairns et al. |

As a group, these patents generally discuss ferritic catalyst supports upon which alumina is found as microcrystals, coatings, whiskers, etc. Many disclose that platinum group metals are suitably placed on those supports as catalysts. None suggest the ability of palladium to limit the catalyst temperature or the use of a diffusion barrier on the exterior of the catalyst as an aid to the catalyst operation.

Moreover, in a practical sense, the use of metal substrates has been limited to applications where the adiabatic combustion temperature is below 1100° C. or 1000° C. and where the complete combustion of the fuel/air mixture will result in a substrate temperature that would not damage the metal. This limitation caps the final gas temperature that can be achieved or requires the use of staged fuel or air addition further complicating the combustor design. The use of the inventive process limits the metal substrate temperature to less than 850° C. at one atm pressure and to less than 950° C. at 16 atm pressure even for fuel/air mixtures with adiabatic combustion temperatures up to 1500° C.

By limiting the substrate temperature, the inventive process also offers advantage for ceramic substrates since limiting the substrate temperature reduces thermal stress and the propensity for structural failure due to thermal shock during start-up and shutdown of the combustor. This protection is especially important for fuel/air ratios corresponding to adiabatic combustion temperatures of 1300° C. to 1600° C.

In summary, although the literature suggests various unrelated portions of the inventive process and the catalyst structure, none of these documents suggests that a palladium catalyst (either with or without an external diffusion layer) can offer advantage by limiting the substrate temperature nor is such a structure suggested.

SUMMARY OF THE INVENTION

This invention is both a catalyst structure and a partial combustion process in which a fuel/air mixture having a high adiabatic combustion temperature undergoes partial combustion using that catalyst structure. The catalyst structure causes the extent of combustion to be self-limiting and, therefore, the temperature of the catalyst structure itself is maintained at a comparatively low temperature, e.g., a temperature significantly below the inherent combustion temperature of the gas passing through the catalyst.

The catalyst structure comprises palladium on a ceramic or, preferably, a metal support configured such that the feed gas and resulting combustion gas flow easily and quickly through the support.

DESCRIPTION OF THE INVENTION

This invention is a catalyst structure and also a partial combustion process in which a fuel/air mixture with a high adiabatic combustion temperature is partially combusted on that specific catalyst structure. The structure is a palladium-based catalyst on a ceramic or metal monolith which desirably has been coated with a minor amount (a diffusion barrier) of a non-catalytic metal oxide. The process produces an exhaust gas at temperature which may be used either at that temperature or introduced into additional combustion stages for further use in a gas turbine, boiler, or furnace.

Catalytic Structures

The catalyst comprises palladium on a support. Desirably the support is first at least partially coated with a coating of an oxidic support material (often called a "washcoat") prior to palladium addition. The structure (after the palladium addition) may then be coated with another layer (often called here a "barrier coat").

Palladium is fairly active as an oxidation catalyst at temperatures of 325° C. (at one atmosphere of air) and lower and consequently is useful in a combustion process as a catalyst for the initial combustion phase. As was discussed above, the catalytic activity of palladium as a fuel oxidation catalyst is believed due to the presence of palladium oxide. Palladium metal does not appear to be a very active as a catalyst except at fairly high temperatures, e.g., substantially above to 800° C. (at one atmosphere). Palladium metal is readily oxidized to palladium oxide in the presence of excess oxygen at temperatures as low as 325° C. according to the equilibrium reaction:

However, as the temperature rises, the equilibrium shifts to the left, i.e., the palladium oxide decomposes. This transition causes the reaction temperature to be self-limiting. At one atmosphere of air the combustion goes readily up to a temperature of approximately 780° C., the palladium oxide becomes the lesser present species, and the reaction consequently slows.

The temperature at which palladium oxide converts to palladium depends in part on the oxygen partial pressure. The conversion temperature may be measured by a TGA procedure which measures the weight loss of palladium oxide as the temperature increases. For a chosen operating oxygen pressure, the palladium oxide to palladium transition point or region can be measured by a TGA procedure. This transition point will establish the self-limiting substrate temperature for a particular set of operating conditions. A palladium catalyst used as a combustion catalyst will generally limit the substrate temperature to this TGA transition limiting temperature or below.

Although palladium will limit the catalyst substrate temperature to the palladium oxide/palladium TGA transition temperature in most cases, for very active palladium catalyst or for very high preheat temperatures the palladium metal (the low activity species) could have sufficient activity to cause the substrate temperature to rise above the palladium oxide/palladium TGA transition temperature. This temperature "runaway" has been observed under certain conditions and results in the catalyst temperature rising uncontrollably to a higher value. Obviously, at these high temperatures the palladium will sinter, lose surface area, and may vaporize resulting in substantial deterioration of the catalyst. The "runaway" combustion may be observed either as an oscillation of the wall temperature of the catalyst structure from low to high (significantly above 850° C.) or as a substantial increase of the wall temperature above the limiting temperature.

"Runaway" combustion is usually prevented by the action of the palladium itself at the limiting temperature since the active palladium oxide species is converted to less catalytically active palladium metal. However, for very high activity catalysts, it has been found that a diffusion barrier coating on the catalyst surface prevents "runaway" combustion. "Runaway" combustion may be prevented in this invention by coating the catalyst with a thin washcoat of an inert non-catalytic oxide material which inhibits the catalyst's activity to a degree sufficient to prevent "runaway" but not so much as to prevent partial catalytic combustion.

The palladium metal is added in an amount at least sufficient to provide catalytic activity. The specific amount added depends on a number of requirements, e.g., the fuel used, economics, activity, life, contaminant presence, etc. The theoretical maximum amount of metal is likely just enough to cover the maximum amount of support without causing undue metal crystallite growth and concomitant loss of activity. These clearly are competing factors: maximum catalytic activity requires higher surface coverage but higher surface coverage can promote growth between adjacent crystallites. Furthermore, the form of the catalyst support must be considered. If the support is used in a high space velocity environment, the catalyst loadings should be high to maintain sufficient conversion even though the residence time is low. Economics has as its general goal the use of the smallest amount of catalytic metal which will do the required task. Finally, the presence of contaminants in the fuel would mandate the use of higher catalyst loadings to offset deterioration in the catalyst due to deactivation.

The palladium metal content of this catalyst composite is typically quite small, e.g., from 0.01% to approximately 20% by weight, and (preferably) from 0.01% to approximately 10% by weight.

The palladium may be incorporated onto the support in a variety of different methods using palladium complexes, compounds, or dispersions of the metal. The compounds or complexes may be water or hydrocarbon soluble. The palladium metal may be precipitated from solution or absorbed into the catalyst carrier in its dissolved form. The liquid carrier generally needs only to be removable from the catalyst carrier by volatilization or decomposition while leaving the palladium in a dispersed form on the support. Examples of the palladium complexes and compounds suitable in producing the catalysts used in this invention are palladium chloride, palladium diammine dinitrite, palladium nitrate, palladium tetrammine chloride, palladium 2-ethylhexanoic acid, sodium palladium chloride, and a variety of other palladium salts or complexes.

Additionally, the catalytic material may be placed on the support so that the leading edge of the catalyst structure is more active. For instance, the catalyst may be more concentrated at that end. This permits the catalyst to "light off" at a lower temperature but should not cause "runaway".

We have found that one or more catalyst adjunct metals selected from Group IB (silver or gold) or Group VIII noble metals (platinum, ruthenium, rhodium, iridium, osmium) are desireable. They may be added in an amount up to a molar equivalent of palladium. The most preferred are silver and platinum. These metals may be added to adjust the self-limiting temperature of the catalyst and, in some cases, to prolong the activity of the catalyst.

The preferred supports for this catalysts composition are metallic. Metallic supports in the form of honeycombs, spiral rolls of corrugated sheet (which may be interspersed with flat separator sheets), columnar (or "handful of straws"), or other configurations having longitudinal channels or passageways permitting high space velocities with a minimal pressure drop are desireable in this service. The structures are malleable, may be mounted and attached to surrounding structures more readily, and off lower flow resistance due to walls which are thinner than can be readily manufactured in ceramic supports.

Another practical benefit attributable to metallic supports is the ability to survive thermal shock. Such thermal shocks occur in gas turbine operations when the turbine is started and stopped and, in particular, when the turbine must be rapidly shut down. In this latter case, the fuel is cut off or the turbine is "tripped" because the physical load on the turbine, e.g., a generator set, has been removed. Fuel to the turbine is immediately cut off to prevent overspeeding. The temperature in the combustion chambers (where the inventive process takes place) quickly drops from the temperature of combustion to the temperature of the compressed air. This drop could span more than 1000° C. in less than one second. In any event, the catalyst is deposited (or otherwise placed) on the walls within the channels or passageways of the metal support in the amounts specified above. Several types of support materials are satisfactory in this service: aluminum, aluminum-containing or aluminum-treated steels, and certain stainless steels or any high temperature metal alloy, including cobalt and nickel alloys where a catalyst layer can be deposited on the metal surface.

The preferred materials are aluminum-containing steels such as those found in U.S. Pat. Nos. 4,414,023 to Aggen et al., 4,331,631 to Chapman et al., and 3,969,082 to Cairns, et al. These steels—as well as others sold by Kawasaki Steel Corporation (River Lite 20-5 SR), Vereinigte Deutchse Metallwerke AG (Alumchrom I RE), and Allegheny Ludlum Steel (Alfa-IV)—contain sufficient dissolved aluminum so that when oxidized the aluminum forms alumina whiskers, crystals, or coatings on the steel's surface to provide a rough and chemically reactive surface for better adherence of the washcoat.

The steels (after alumina formation) may have palladium compounds applied directly by appropriate treatment to incorporate the palladium. Preferably, however, the palladium compounds are applied after application of a washcoat to the steel surface. The washcoat may be applied using an approach such as is described in the art, e.g., the application of zirconia, titania, silica, or gamma-alumina sols or sols of mixed oxides containing aluminum, silicon, titanium, zirconium, and additives such as barium, silicon, cerium, lanthanum, chromium, titanium or a variety of other components. For better adhesion of the washcoat, a primer layer can be applied containing hydrous oxides such as a dilute suspension of pseudo-boehmite alumina as described in U.S. Pat. No. 4,279,782 to Chapman et al. Desirably, the surface is coated with a zirconia suspension, dried, and calcined to form a high surface area adherent oxide layer on the metal surface.

Other high surface area oxidic materials also may be used separately in the washcoat layer. Zirconia is preferred but other oxides such as silica, titania, and mixtures or oxides of barium, cerium, lanthanum, chromium, and the like may be used.

The washcoat may be applied in the same fashion one would apply paint to a surface, e.g., by spraying, direct application, dipping the support into the washcoat material, etc. An alternative process for adding the catalyst layer to the support structure is first to add the palladium to the inert oxide powder. The palladium is fixed on the oxide by heat treatment or by a chemical process. The palladium/inert oxide mixture may then be milled to form a colloidal sol and this colloidal sol applied to the metal or ceramic substrate by spraying, dipping, or the like.

Aluminum structures are also suitable for use in this invention and may be treated or coated in essentially the same manner. Aluminum alloys are somewhat more ductile and likely to deform or even to melt in the temperature operating envelope of the process. Consequently, they are less desireable supports but may be used if the temperature criteria can be met.

Once the washcoat and palladium have been applied to the support and calcined, one or more coatings of a refractory oxide may then be applied as a diffusion barrier to prevent the temperature "runaway" discussed above. This barrier layer may be alumina, silica, zirconia, titania, or a variety of other oxides with a low catalytic activity for oxidation of the fuel or mixed oxides or oxides plus additives similar to those described for the washcoat layer. The barrier layer may range in thickness from 1% of the washcoat layer thickness to a thickness substantially thicker than the washcoat layer, preferably from 10% to 100% of the washcoat layer thickness. The preferred thickness will depend on the operating conditions of the catalyst, including the fuel type, the gas flow velocity, the preheat temperature, and the catalytic activity of the washcoat layer. It has also been found that the application of the diffusion barrier coating only to a downstream portion of the catalyst structure, e.g., 30% to 70% of the length, can provide sufficient protection for the catalyst under certain conditions.

As with the washcoat, the barrier layer(s) may be applied using the same application techniques one would use in the application of paint.

The washcoat, catalyst, and diffusion or barrier coat may be applied to all surfaces of a catalyst support such as described herein or may be applied only to a surface opposite a non-coated surface. For instance, the spiral corrugated structure noted above may be coated on one side with the washcoat, catalyst, and diffusion barrier coat. The treated corrugated structure may then be rolled into a monolith. A separator sheet of similar material may also be coated on one side with the catalytic material and rolled along with the corrugated sheet into the spiral monolith. In any event, the surface in the monolith having the catalyst placed thereon produces heat during the combustion process. This heat may pass to the gas flowing by or may be conducted through the catalyst structure to the adjacent non-catalytic (and hence) cooler surface. From there the heat would pass into the non-combusted gas passing along that surface. This allows control of the temperature of the catalytic surface of the catalyst structure by an integral heat exchange without resorting to such measures as air dilution or extraneous heat exchange structures. Such a control might be desireable where (for instance) the preheat temperature of the inlet gas is quite high and the gas flow rate is unstable.

This catalyst structure should be made in such a size and configuration that the average linear velocity of the gas through the longitudinal channels in the catalyst structure is greater than approximately 0.2 m/second throughout the catalytic structure and no more than approximately 40 m/second. This lower limit is greater than the flame front speed for methane and the upper limit is a practical one for the type of supports currently commercially available. These average velocities may be somewhat different for fuels other than methane.

The Process

This process may be used with a variety of fuels and at a broad range of process conditions.

Although normally gaseous hydrocarbons, e.g., methane, ethane, and propane, are highly desireable as a source of fuel for the process, most carbonaceous fuels capable of being vaporized at the process temperatures discussed below are suitable. For instance, the fuels may be liquid or gaseous at room temperature and pressure. Examples include the low molecular weight aliphatic hydrocarbons mentioned above as well as butane, pentane, hexane, heptane, octane, gasoline, aromatic hydrocarbons such as benzene, toluene, ethylbenzene, and xylene; naphthas; diesel fuel and kerosene; jet fuels; other middle distillates; heavier fuels (preferably hydrotreated to remove nitrogenous and sulfurous compounds); oxygen-containing fuels such as alcohols including methanol, ethanol, isopropanol, butanol, or the like; and ethers such as diethylether, ethyl phenyl ether, MTBE, etc. Low BTU gases such as town gas or syngas may also be used as fuels.

The fuel is typically mixed into the combustion air in an amount to produce a mixture having an adiabatic combustion temperature greater than the temperature achieved by this inventive process at the operation pressure of the process. Preferably the adiabatic combustion temperature is above 900° C., most preferably above 1000° C. Non-gaseous fuels should be at least partially vaporized prior to their contacting the catalyst zone. The combustion air may be at atmospheric pressure or lower ($-0.25$ atm) or may be compressed to a pressure of 35 atm or more. Stationary gas turbines (which ultimately could use the gas produced by this process) often operate at gauge pressures in the range of five atm to 16 atm. Consequently this process may operate at $-0.25$ atm to 35 atm, preferably zero atm to 17 atm.

The process uses a catalytic amount of a palladium-containing material on a catalyst (preferably, metal) support having a low resistance to gas flow.

The fuel/air mixture supplied to the catalyst should be well mixed and the gas inlet temperature may be varied depending on the fuel used. This temperature may be achieved by preheating the gas through heat exchange or by adiabatic compression of the incoming air. A benefit of this process is that the preferred catalysts are sufficiently active that the catalytic combustion begins to take place at the temperature found at the compressor outlet.

The catalytic zone is sized so that the bulk outlet temperature of the gas from that zone is below the catalyst TGA temperature for the $O_2$ concentration and pressure but, generally, is no more than approximately 800° C. (preferably no greater than 550° C. to 650° C.). In addition, the catalyst temperature should not exceed 1000° C. and preferably not exceed 950° C.

EXAMPLES

These examples show the production of catalysts within the scope of the invention and their use in the inventive process. Comparative catalysts and processes are also shown.

EXAMPLE 1

This example is in several parts and demonstrates the temperature limiting capabilities of the inventive palladium-based catalyst as compared to a similar platinum-based combustion catalyst.

Part A (Comparative Platinum Catalyst Preparation)

A platinum catalyst was prepared as follows: 250 g of a low alkali gamma-alumina, 422 ml distilled water, and 42 ml concentrated (70.3%) nitric acid were placed in a half gallon polymer-lined ball mill. The ball mill was filled half full with alpha-alumina grinding media.

The mixture was ball milled for eight hours to produce a colloidal alumina sol containing approximately 35% by weight $Al_2O_3$.

A 100 cell/inch$^2$ (cpsi) cordierite monolith (two inch diameter by two inch length) was dipped in this alumina sol and the excess blown from the channels of the monolith with air. This monolith was then dried at 100° C. and calcined in a muffle furnace at 850° C. for ten hours. The final monolith contained approximately 20% by weight alumina washcoat.

The alumina washcoated monolith was dipped in an $H_2PtCl_6$ solution containing approximately 0.14 g platinum/g solution. The excess solution was blown out with air and the monolith dried and calcined at 500° C. The platinum impregnation was repeated twice more. The final catalyst was calcined at 850° C. for ten hours. The final catalyst contained 4.5% by weight platinum.

Part B (Palladium Catalyst Preparation)

A palladium catalyst was prepared. An alumina washcoated cordierite monolith was prepared and calcined as described above. A palladium solution was prepared by dissolving $PdCl_2$ in two equivalents of hydrochloric acid and diluting to 0.042 g palladium/ml. The washcoated monolith was dipped in this solution, the excess solution blown out with air, and the catalyst dried and calcined at 850° C. for ten hours. The final catalyst contained approximately 0.5% palladium by weight.

Part C

In this Part each of the two catalysts from Parts A and B were installed in a combustion test reactor. The reactor was two inch ID and allowed careful control of the preheat temperature of the $CH_4$/air mixture prior to contact with the catalyst. The reactor was also equipped with thermocouples to measure a variety of different gas and catalyst wall temperatures.

Platinum Catalyst

The comparative platinum catalyst made in Part A was installed in the reactor. Air at 500 Standard Liters Per Minute (SLPM) was passed over an electric heater, a static gas mixer, and through the catalyst. Natural gas containing approximately 93% methane was introduced into the air stream just upstream of the gas mixer. Gas temperatures were measured before and after the catalyst with ceramic covered thermocouples suspended in the gas stream. The catalyst substrate temperature was measured by a thermocouple positioned in one of the channels of the ceramic monolithic catalyst near the outlet of the catalyst.

Air was heated to 550° C. and methane flow increased to 1.1 SLPM corresponding to a fuel/air ratio of 0.0022. The substrate temperature was monitored. The fuel/air ratio was increased in steps to 0.002 and the substrate temperature recorded for each fuel/air ratio. These data are presented in FIG. 1. At a fuel/air ratio of 0.010, the catalyst was sufficiently active to raise the substrate temperature to 740° C. This value approximated the calculated adiabatic combustion temperature for the mixture of 760° C. As the fuel/air ratio is increased, the substrate temperature closely matched the adiabatic combustion temperature. This showed that the platinum catalyst was combusting all of the fuel at the catalyst surface.

Palladium Catalyst

The palladium catalyst prepared above was then tested in a similar manner. Again, as the fuel/air ratio was increased the substrate temperature rose and tracked the calculated adiabatic combustion temperature. However, as shown in FIG. 1 (at fuel/air ration between 0.013 and 0.020) the substrate temperature remained at 800° C.

Figure 1:
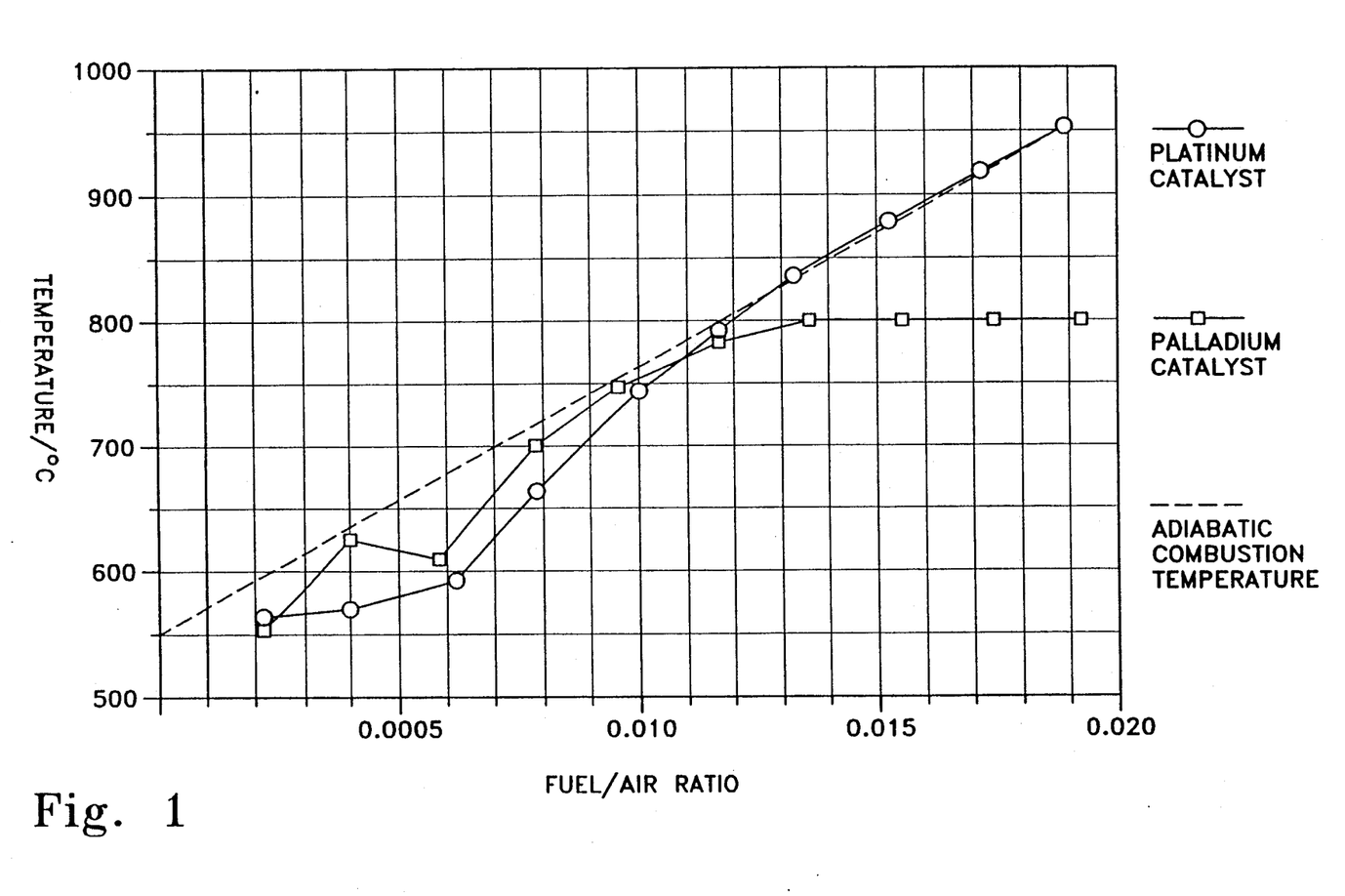
FIG. 1 is a graph comparing the respective operating temperatures of palladium or platinum catalysts at various of fuel/air ratios.

As displayed in FIG. 1, this example shows that a combustion catalyst comprising palladium limits the temperature of the catalyst composition to approximately 780° C. The temperature of the platinum catalyst, on the other hand, clearly tracks the calculated adiabatic combustion temperature.

EXAMPLE 2

This example demonstrates measurement of the temperature at which palladium oxide converts to palladium metal and, therefore, the temperature limit of the catalyst substrate during methane combustion in excess air.

Figure 2A:
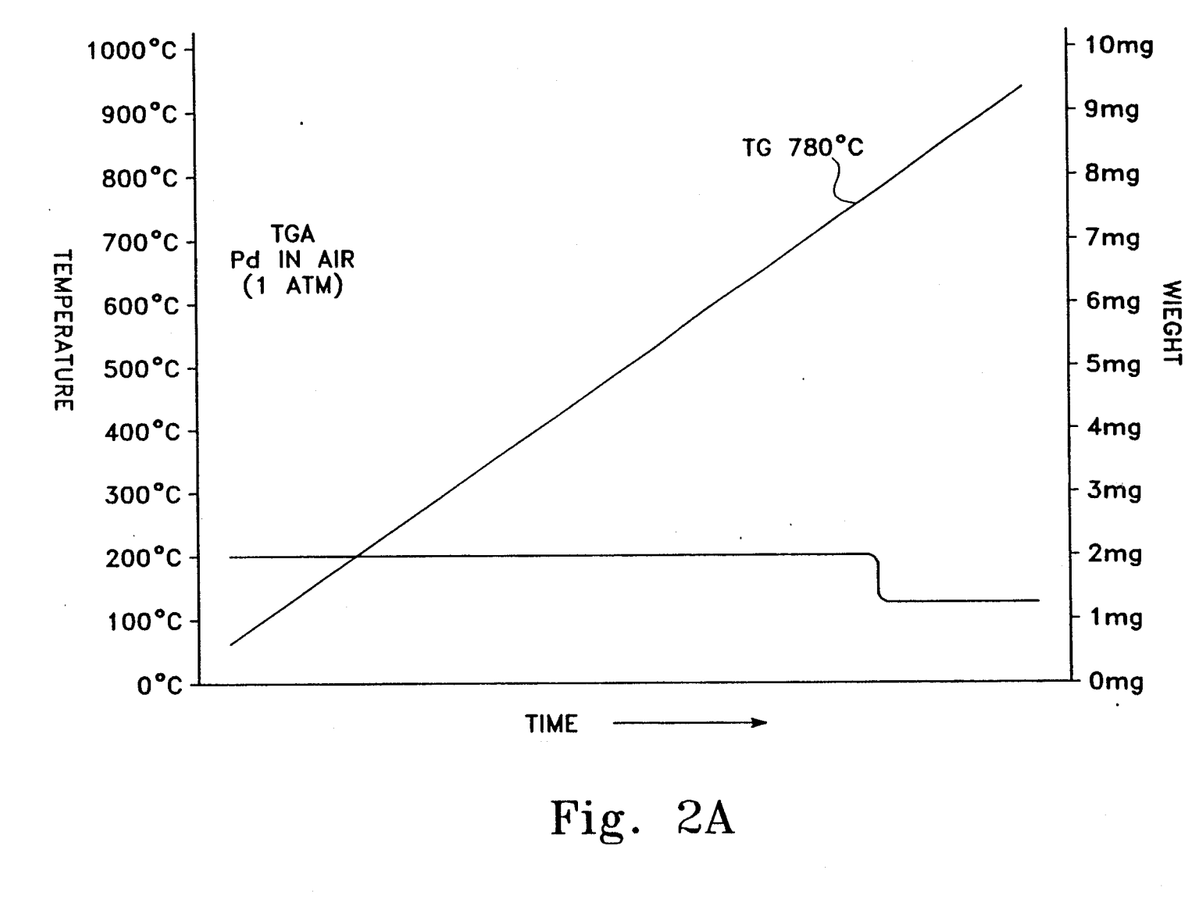
FIG. 2A is a graph of the TGA of palladium oxide/palladium at one atm air.

A sample of 21.9 mg of palladium oxide powder was loaded into a TGA apparatus and the sample chamber purged with dry air flowing at 40 ml/minute. The temperature of the sample was increased at 10° C./minute and the sample weight monitored continuously to produce the TGA curve shown in FIG. 2A. At 795° C. the palladium oxide decomposed into palladium and evolved oxygen resulting in a weight loss. The measured weight loss of 2.74 mg resulting sample corresponded to 12.5% of the original palladium oxide sample weight. The theoretical weight loss for the equation:

$$Pta \rightarrow Pd + O_2$$

was 13.1%. Repetition of the TGA experiment at a 5° C./minute heating rate also gave a palladium oxide to palladium transition point at 795° C.

The transition from palladium oxide to palladium in air at atmospheric pressure measured by TGA occurs at approximately the same temperature as the limiting substrate temperature (approximately equal to 780° C.) determined when using palladium as the catalyst as found in Example 1 above.

Figure 2B:
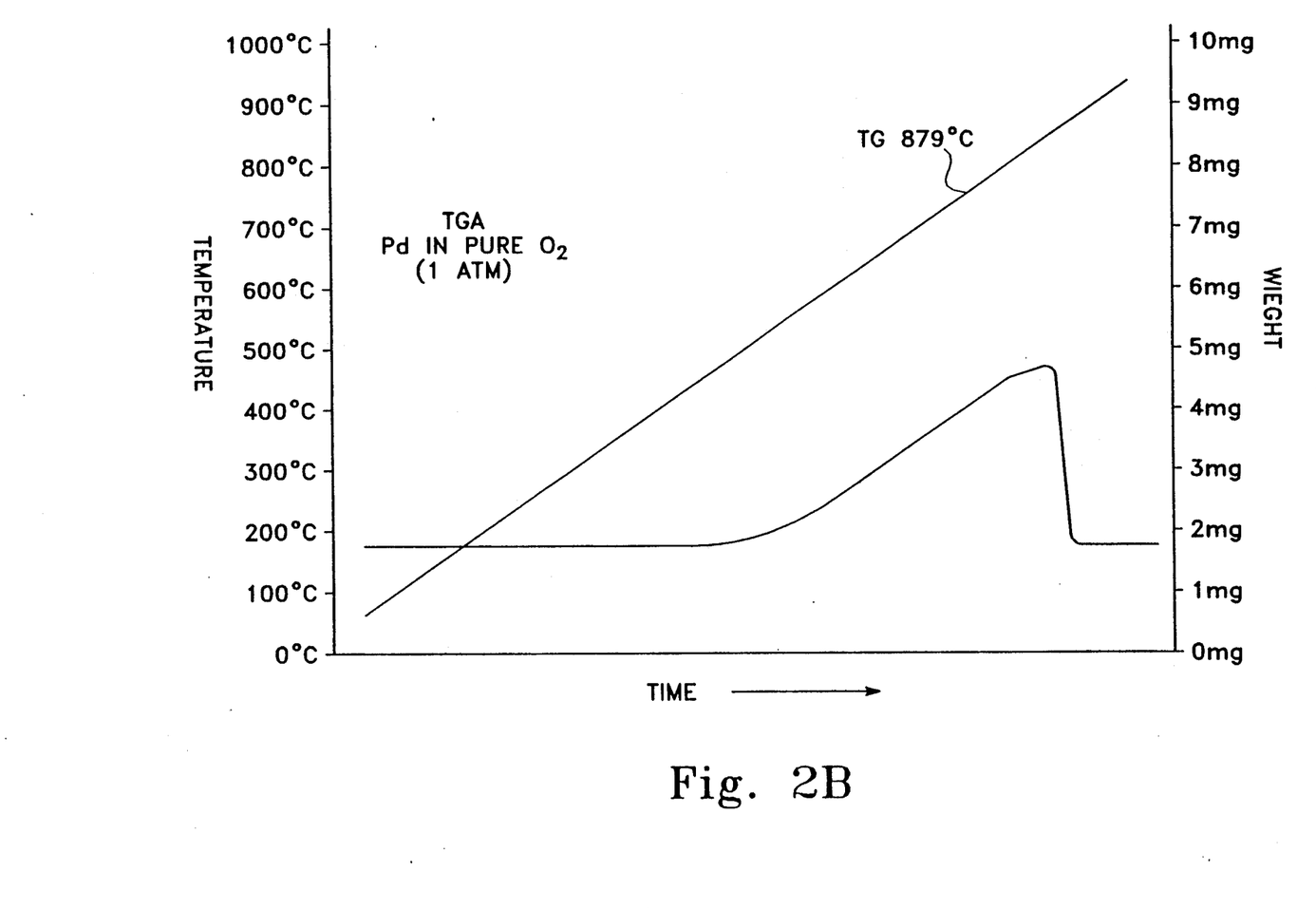
FIG. 2B is a graph of the TGA of palladium oxide/palladium at one atm of pure $O_2$.

The TGA experiment was repeated with a new sample of palladium oxide but with the sample chamber purged with pure oxygen. As is shown in FIG. 2B, the measured palladium oxide to palladium transition temperature was 880° C. At higher oxygen partial pressure, the palladium oxide to palladium transition point would occur at even higher temperatures.

This example shows that the TGA for palladium oxide/platinum is a function of the particular oxygen partial pressure.

EXAMPLE 3

This example is in two parts. Part A shows the preparation of a steel monolith using palladium but having no protective diffusion barrier layer above the catalyst layer; Part B shows the use of the monolith and its propensity for "runaway" even when used at low temperatures.

Part A

A 75.5 inch long sample of two inch wide Kawasaki River Lite 20-5SR corrugated steel and a 73 inch long sample of two inch wide Kawasaki River Lite 20-5SR flat steel strip were heat-treated in an oven in open air at 950° C. for 16 hours. The heat treatment resulted in the growth of alumina whiskers on the steel surface due to the aluminum contained in the steel.

A primer coat was applied to both flat and corrugated strips on both sides by spraying with a 5% by weight pseudo-boehmite colloidal aqueous suspension to obtain a layer representing approximately 1% by weight of the metal. The metal was dried at 90° C.

A high surface area washcoat was applied by spraying with a 20% by weight colloidal suspension of gamma-alumina, drying at 90° C., and calcining in air at 850° C. for five hours. The final washcoat represented 20% of the final catalyst weight.

A palladium-containing solution was prepared by dissolving $Pd(NH_3)_2(NO_2)_2$ in nitric acid. This palladium solution was applied to the washcoated foil strips by spraying to obtain a final catalyst loading of approximately 2% by weight palladium metal. The strips were dried at 90° C. and calcined in air at 850° C. for four hours.

The corrugated and flat strips were layered together and rolled to form a spiral monolith of approximately two inches diameter and with approximately 300 channels per square inch of geometric area. The open area of the monolith is approximately 2.36 $inch^2$ (or approximately 77% open).

Part B

This Part shows the operation of the catalyst monolith fabricated in Part A in "normal" inlet gas temperature ranges of between 325° C. and 400° C.

The catalyst structure was placed in the reactor system discussed above. Two thermocouples were installed in the downstream end of the monolith to measure monolith wall temperature. The bulk gas temperature at the outlet was also monitored.

A flow of 1500 SLPM of air and 70 SLPM of $CH_4$ were introduced into the monolith. The mixed gas was initially preheated to 300° C. The preheat temperature was slowly increased at a rate of approximately 20° C./minute.

Figure 3:
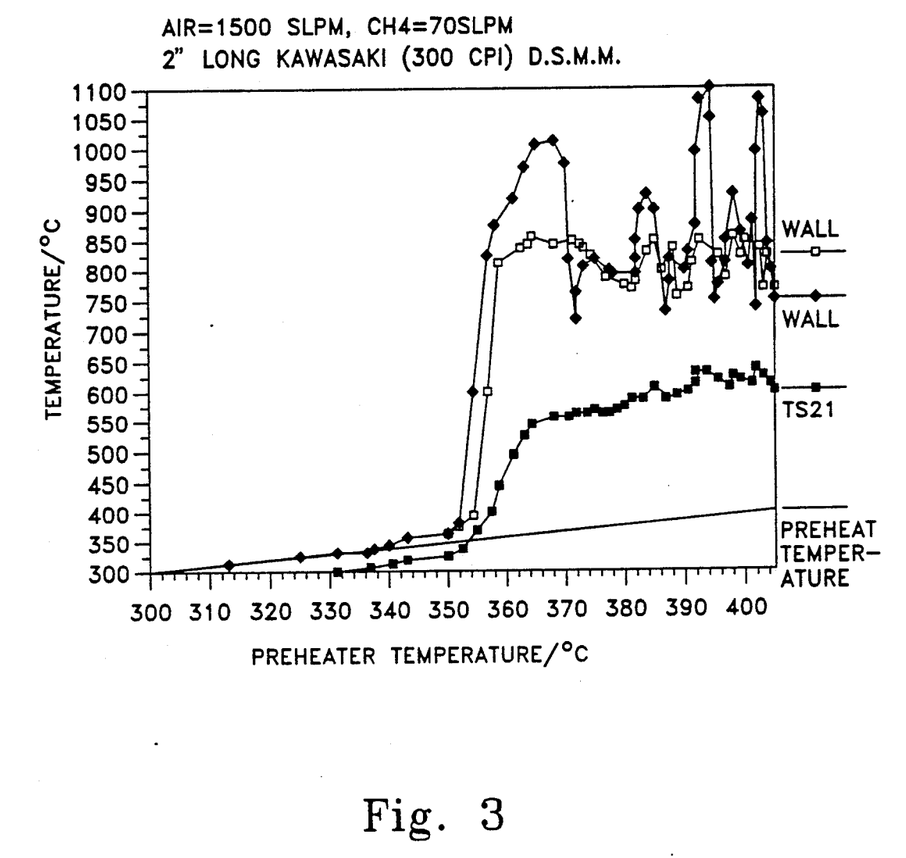
FIG. 3 is a graph of various process outlet temperatures as a function of catalyst preheat temperature for a particular uncoated catalyst.

No substantial reaction was observed until the gas preheat temperature reached 350° C. to 355° C. At that point the catalyst lit-off, that is, the bulk gas temperature at the outlet increased to approximately 550° C. The temperature at one of the monolith wall thermocouples increased quickly to 1000° C. and then began to oscillate quickly between approximately 700° C. and 1100° C. as shown in FIG. 3.

This test sequence was then terminated. The catalyst was cooled.

A second test was performed at the monolith using the same test sequence. The catalyst lit-off between 325° C. and 335° C. The wall temperature oscillation was again in evidence.

Consequently, even though the palladium component is considered in the art to limit the temperature increase of the catalyst, the use of palladium alone does not appear always adequate to limit the wall temperature.

EXAMPLE 4

This example shows the preparation of a steel monolith support using palladium but having a barrier or diffusion barrier overcoat.

Part A

A 70.0 inch section of Kawaski River Lite 20-5SR corrugated steel strip and a 70.0 inch section of Kawaski River Lite 20-5SR flat steel strips were heat treated in an oven in the open air at 950° C. for 16 hours to cause surface alumina whisker growth.

Using the procedure of Example 3, the two metal strips were sprayed with primer pseudo-boehmite, gamma-alumina washcoat, and palladium. The various drying and calcining steps were also done exactly as found in Example 3.

A diffusion barrier coating was then applied to the catalyst surface by spraying a 30% gamma-alumina colloidal sol, drying at 90° C., and a calcining at 850° C. for five hours. The barrier coating was approximately 5% of the total catalyst weight.

The two strips were then rolled together to make a spiral monolith of approximately two inch diameter.

The free open area of the monolith was 2.36 $inch^2$ (or approximately 78% open).

Part B

This Part shows the operation of the catalytic monolith fabricated in Part A in the same temperature range and using the same temperature rate increase as that used in Example 3.

The rolled monolith was inserted into the reactor system. The air rate was 1500 SLPM and $CH_4$ was the fuel at 60.5 SLPM. The catalyst lit off at approximately 365° C. The bulk gas temperature at the catalyst outlet quickly reached 600° C. and stabilized. The wall temperature did not oscillate as it had in Example 4.

This catalyst structure was then cooled and the test sequence repeated four more times. The catalyst lit off in the 335° C. to 345° C. range each time and the wall temperature did not oscillate in the normal preheat range between 325° C. and 410° C.

EXAMPLE 5

This example shows the temperature limiting effect of the inventive catalyst with a single fuel/air ratio and a constantly increasing preheat temperature. In spite of the increasing inlet temperature and the resulting outlet partially combusted gas temperature, the wall of the catalyst structure remains at approximately 800° C.

A high concentration palladium catalyst was prepared. A 50 mm diameter by 50 mm length cordierite monolith with 100 cpsi was coated with alumina washcoat as described above. The washcoated monolith was calcined at 850° C. for ten hours. A $PdCl_4^{2-}$ solution was prepared by dissolving $PdCl_2$ in two equivalents of hydrochloric acid. The final solution concentration was 0.081 g palladium/ml. The washcoated monolith was dipped in this palladium solution and the excess solution blown out with air. $H_2S$ gas was then passed through the monolith structure to entirely convert the $PdCl_4^{2-}$ to PdS. The monolith was then calcined at 500° C. in air. The palladium impregnation procedure was repeated and the final calcination performed at 850° C. for ten hours.

This catalyst was placed in the test reactor described above. Thermocouples were installed in a single channel at a distance from the inlet of ten mm, 25 mm, and 48 mm. This channel was sealed with ceramic cement so that the thermocouples measured the substrate ceramic temperature.

Figure 4:
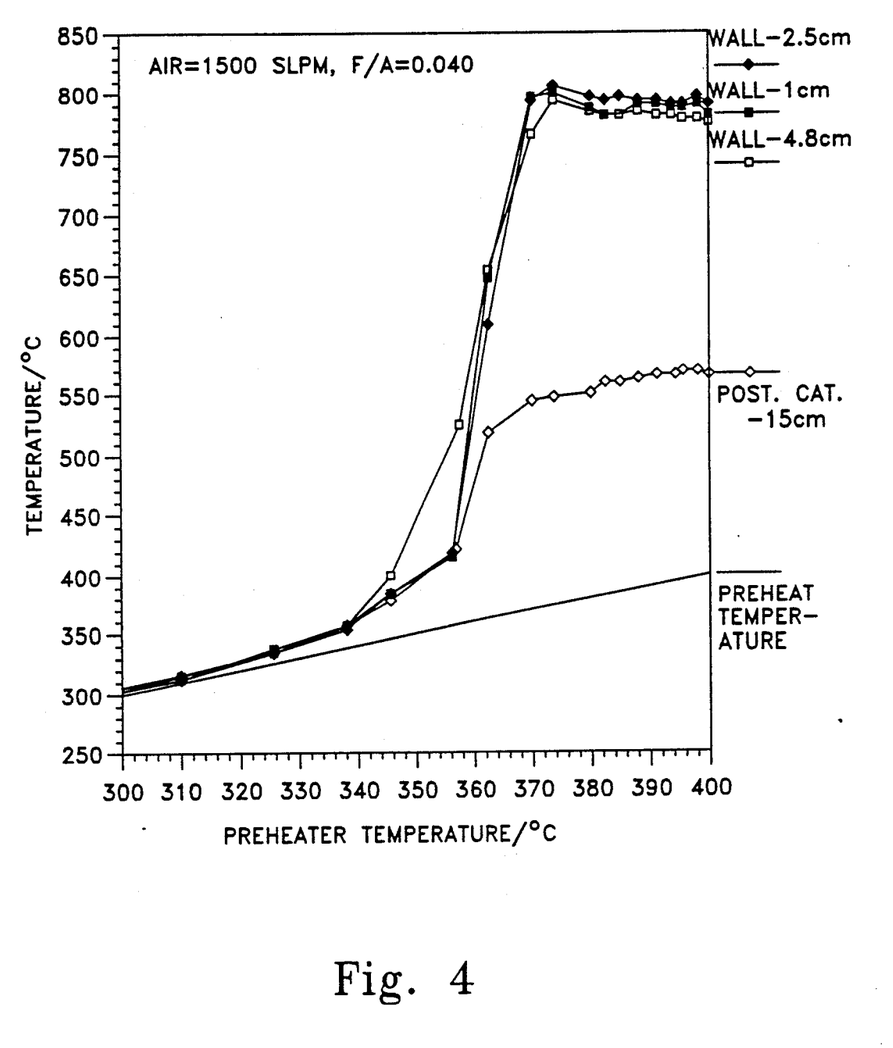
FIG. 4 is a graph of various process outlet temperatures as a function of catalyst preheat temperatures for a palladium-containing catalyst prepared using a palladium chloride salt.

Air at 1000 SLPM and natural gas at 40 SLPM were passed through the catalyst. This feed gas mixture was heated to 300° C. and then increased slowly to monitor catalyst activity as shown in FIG. 4. At 360° C., the catalyst lit-off and its temperature rose above the gas temperature. At approximately 390° C., the substrate temperature from ten mm to the outlet (48 mm) was constant at approximately 800° C. As the inlet gas temperature is further increased, the substrate temperature limited at approximately 800° C.

At this fuel/air ratio and 400° C., the calculated adiabatic combustion temperature was approximately 1240° C. The fact that this high activity catalyst did not cause the substrate temperature to increase to 1240° C. is due to the strong temperature limiting behavior of palladium.

EXAMPLE 6

This example shows the LOT and steady state operation of a palladium catalyst having a zirconia coated cordierite support.

The palladium/zirconia/cordierite catalyst was prepared by first producing a zirconium sol. A 125 gm sample of $ZrO_2$ having a specific surface area of 95 $m^2/gm$ was mixed with 211 ml water and 15 ml of concentrated nitric acid in polymer lined ball mill containing $ZrO_2$ grinding media. The mixture was milled for eight hours.

A cordierite monolithic honeycomb having 100 cpsi was dipped into the sol, dried, and calcined as described above. This process was repeated until the monolith contained about 18% by weight of the $ZrO_2$ washcoat.

A palladium solution was made by dissolving $Pd(NO_2)_2(NH_3)_2$ in aqueous $HNO_3$ and diluting with water until a concentration of 0.083 g palladium/ml was attained. The monolith was dipped into the palladium solution, excess solution blown out with air, dried, and calcined at 850° C. in air. The process was repeated until the catalyst composition contained 2.2% palladium.

Figure 6A:
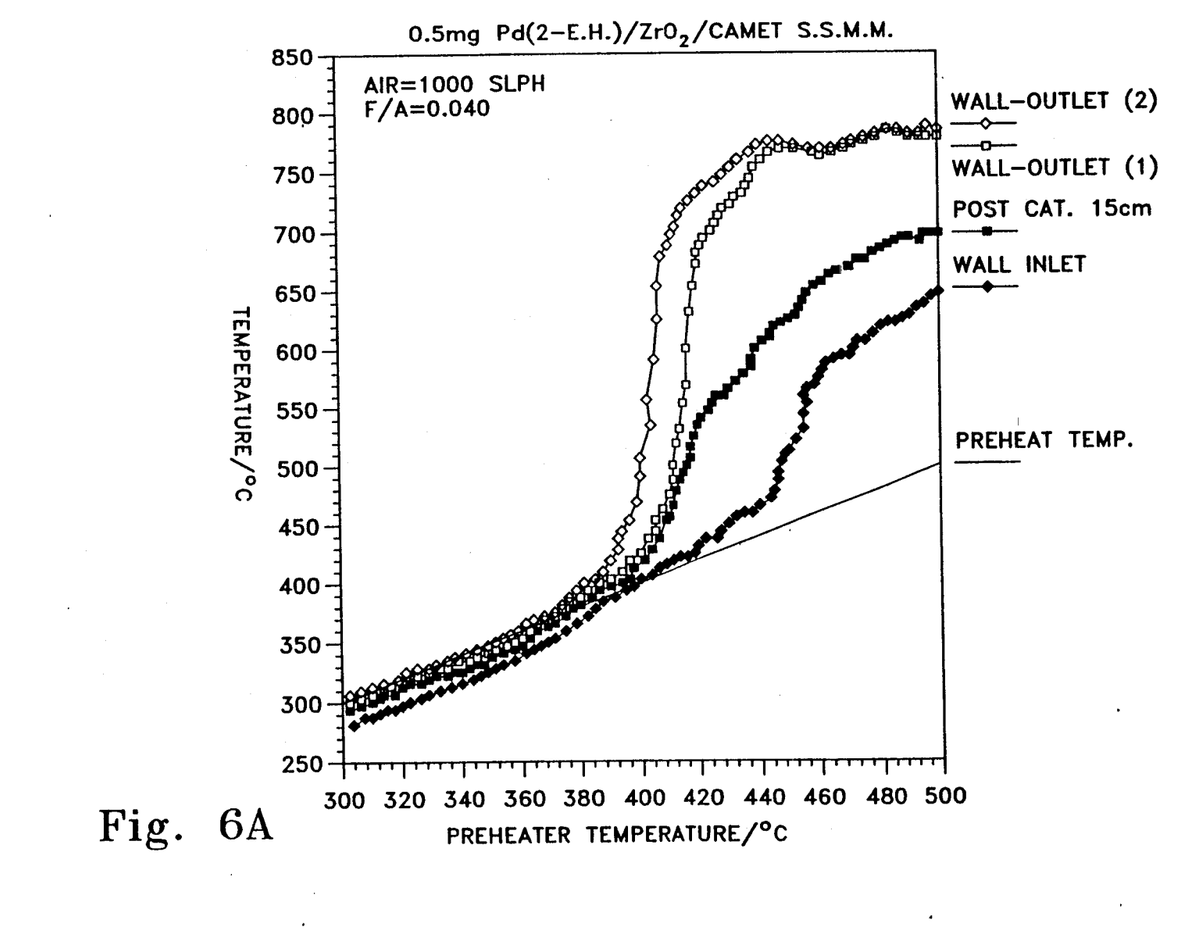
FIGS. 6A and 6B are graphs of LOT and steady state operation temperatures for a zirconia-coated metal monolith.

This catalyst composition was placed in an adiabatic combustion reactor. An air flow of 1500 SLPM and a natural gas flow of 60 SLPM is initiated through the catalyst. The mixed gas temperature ("preheat") is increased at a constant rate. At 350° C. the catalyst becomes active. As is shown in FIG. 6A, at 370° C. of preheat the catalyst outlet becomes constant at about 800° C. Further increases in the preheat temperature do not cause the catalyst outlet temperature to increase. The palladium limits the catalyst outlet temperature to that point.

Figure 5A:
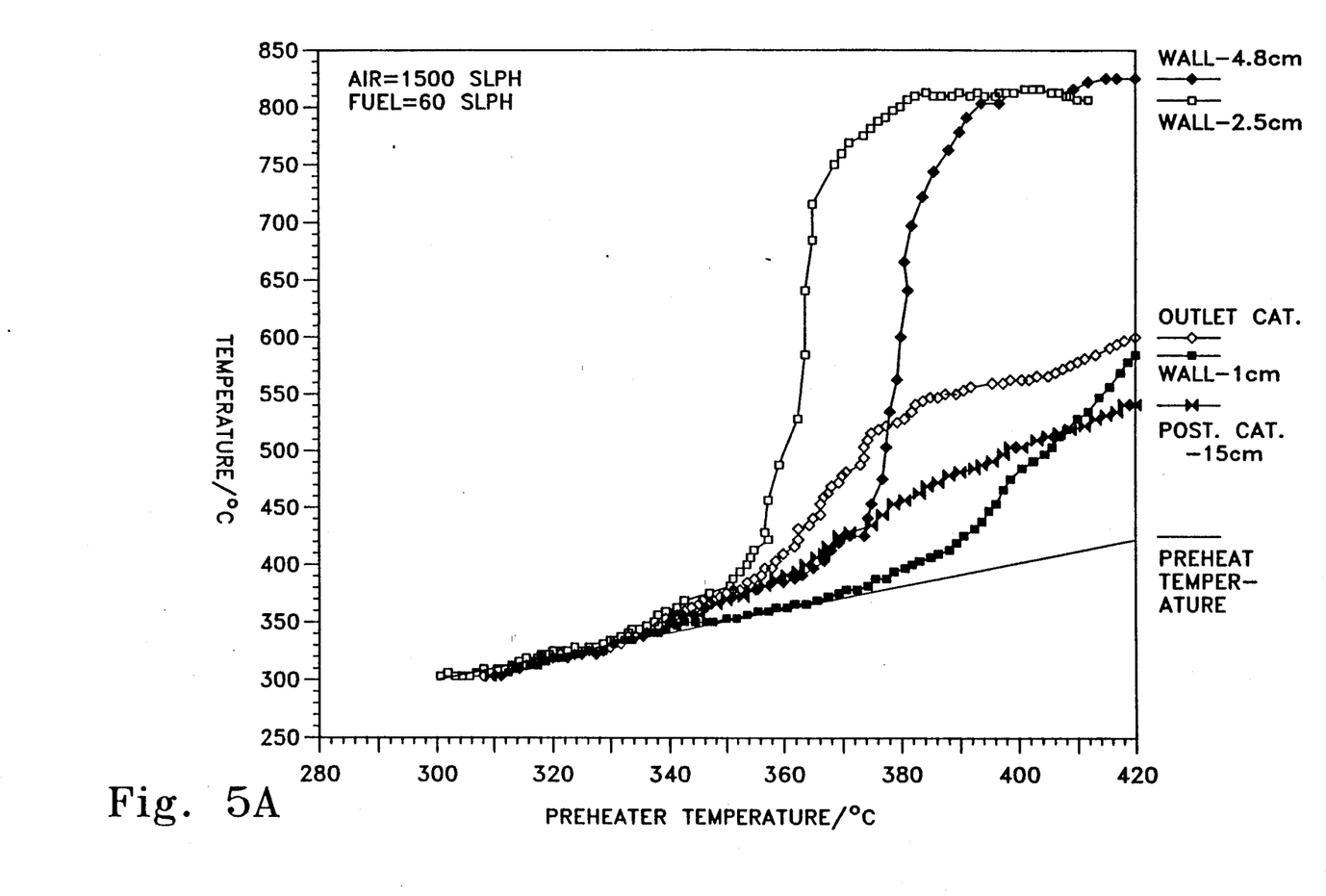
FIGS. 5A and 5B are graphs of LOT and steady state operation temperatures for a zirconia-coated cordierite monolith.
Figure 5B:
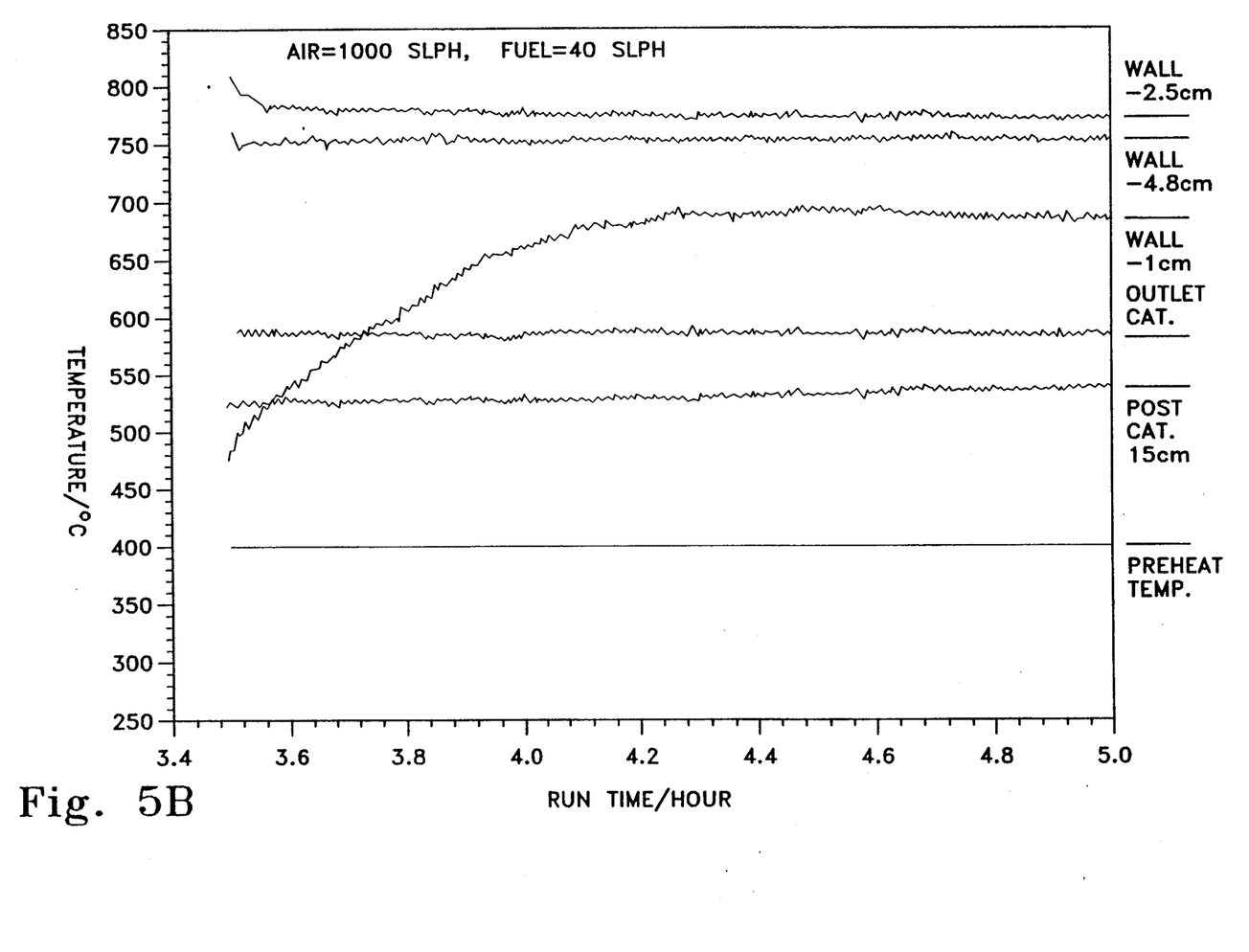

The catalyst was additionally tested for steady state operation at 1000 SLPM of air and 40 SLPM of fuel. The catalyst was operated at a constant preheat of 400° C. As is shown in FIG. 5B, the catalyst was very stable and maintained a catalyst outlet temperature of about 770° C. No decline in activity was noted.

EXAMPLE 7

This example is similar to Example 6 but shows instead the beneficial effect in our partial combustion catalyst of utilizing zirconia on a metal support.

A monolithic metal-foil-based partial combustion catalyst having a $ZrO_2$ coating was prepared and tested for steady-state stability using the following procedure.

A $ZrO_2$ colloidal sol was first produced by hydrolyzing 66 gm of zirconium isoperoxide with water and mixing the resultant mixture with 100 gm of $ZrO_2$ powder and an additional 100 gm of water. The zirconia powder had a specific area of 100 $m^2/gm$. This slurry was ball milled in a polymer lined ball mill with cylindrical $ZrO_2$ media for eight hours. The resultant sol was diluted to a concentration of 15% $ZrO_2$ with additional water.

An Fe/Cr/Al foil was corrugated in a herringbone pattern and oxidized in air at 900° C. to form surface alumina whiskers. The foil was sprayed with the sol using an air atomizer, dried, and calcined in air at 850° C. The resulting foil contained 2 mg $ZrO_2/cm^2$ of foil surface.

A solution containing 0.1 gm palladium/ml was formed by dissolving palladium 2-ethylhexanoic acid in toluene. This solution was sprayed onto the coated metal foil. The foil was dried and calcined and contained about 0.5 mg palladium/$cm^2$ of surface.

The corrugated foil was rolled into a spiral structure having longitudinal passageways throughout. The final structure was about two inches in diameter and two inches in length.

The catalyst was tested for steady-state operation much in the same way that the above catalysts were tested. Thermocouples were installed within the catalyst at distances of 1, 2.5, and 4.8 cm from the entrance of the catalyst structure. Other thermocouples measured the temperature at the outlet of the catalyst and in the gas stream 15 cm after the catalyst.

An air flow of 1000 SLPM and a natural gas flow of 40 SLPM was initiated through the catalyst. The mixed gas temperature ("preheat") was increased at a constant rate. At 400° C. the catalyst becomes active. As is shown in FIG. 6A, at 440° C. of preheat the catalyst outlet becomes constant at about 770° C. Further increases in the preheat temperature did not cause the catalyst outlet temperature to increase. The palladium limits the catalyst outlet temperature to that point.

Figure 6B:
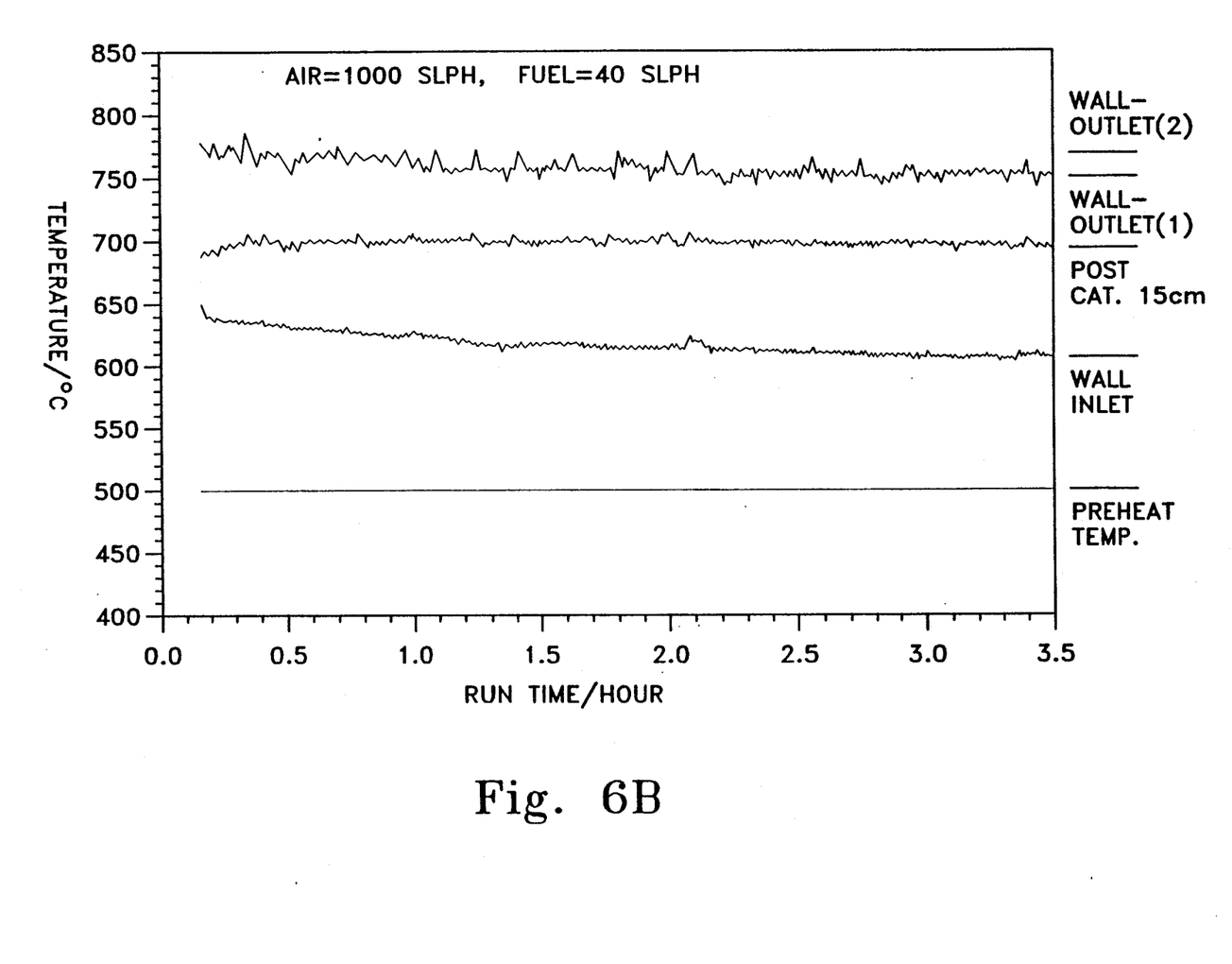

The catalyst was additionally tested for steady state operation at 1000 SLPM of air and 40 SLPM of fuel. The catalyst was operated at a constant preheat of 500° C. As is shown in FIG. 6B, the catalyst was very stable and maintained a catalyst outlet temperature of about 760° C. to 770° C. No decline in activity was noted.

The invention has been given by direct description and explained more fully by example. The invention should not be limited by the examples; the examples are only examples. Others having ordinary skill in this art will recognize equivalent variations of the claimed invention which will be within the spirit of the appended claims.

We claim as our invention:

1. A partial combustion process comprising the steps of:
   a. mixing an amount of an oxygen-containing gas with a combustible fuel to produce a combustible gas mixture, and
   b. passing the combustible gas mixture into a combustion zone comprising palladium catalyst on at least a portion of a catalyst support having passageways for the passage and partial combustion of the combustible gas mixture and where the palladium catalyst is at least partially covered by a diffusion barrier to produce a partially combusted exhaust gas having a bulk temperature less than the adiabatic combustible temperature of the combustible gas mixture and a catalyst temperature less than the TGA temperature for the palladium catalyst.

2. The process of claim 1 where the catalyst support comprises a material selected from the group of metal and a metal having an oxide coating.

3. The process of claim 2 where the catalyst support comprises a ferrous alloy.

4. The process of claim 3 where the catalyst support comprises a ferrous alloy coated by zirconia, titania, silica, alumina, a non-catalytic oxide, a refractory metal oxide, or mixtures thereof.

5. The process of claim 1 where the palladium catalyst additionally comprises one or more adjunct catalyst metals selected from silver, gold, platinum, ruthenium, rhodium, iridium, or osmium.

6. The process of claim 5 where the adjunct catalyst is silver or platinum.

7. The process of claim 1 where the diffusion barrier comprises alumina.

8. The process of claim 1 where the diffusion barrier comprises zirconia.

9. The process of claim 1 where the diffusion barrier layer is a washcoat.

10. The process of claim 1 where the combustible fuel is selected from liquid fuels, gaseous fuels, oxygen containing fuels, and mixtures.

11. The process of claim 10 where the liquid fuels are selected from vaporizable fuels.

12. The process of claim 10 where the gaseous fuels are selected from the group consisting of methane, ethane, ethylene, propane, and propylene.

13. The process of claim 10 where the oxygen-containing fuels comprise $C_1$-$C_5$ alcohols, ethers, or mixtures.

14. The process of claim 1 where the combustible gas comprises methane and the combustible gas mixture is passed into the partial combustion zone at a temperature of at least approximately 325° C.

15. The process of claim 14 where the partial combustion zone has a gauge pressure between −0.25 atm and 35 atm.

16. The process of claim 14 where the gauge pressure is between zero atm and 17 atm.

17. The process of claim 2 where the catalyst support having longitudinal passageways is in the form of a honeycomb, tubes, or rolled corrugation.

18. The process of claim 17 where only a portion of the longitudinal passageway surfaces contain palladium.

19. The process of claim 18 where the portion of the longitudinal passageways surfaces containing palladium are adjacent to passageway surfaces not containing palladium and those surfaces are in integral heat exchange relationship to each other.

20. The process of claim 1 where a portion of the catalyst support first contacting the combustible gas mixture comprises a higher activity palladium catalyst.

21. A partial combustion process comprising the steps of:
a. mixing an amount of air and methane to produce a combustible gas mixture having an adiabatic combustion temperature substantially above 900° C., and
b. passing the combustible gas mixture into a combustion zone containing a catalyst support of a spiral of corrugated ferrous alloy sheet having passageways for the passage and partial combustion of the combustible gas mixture and having a catalyst composition comprising a palladium catalyst in at least a portion of the passageways in said support and where the palladium catalyst is at least partially covered by a diffusion barrier, to produce a partially combusted exhaust gas having a bulk temperature less than the adiabatic combustible temperature of the combustible gas mixture and a catalyst temperature less than the TGA temperature of the palladium catalyst.

22. The process of claim 21 where the diffusion barrier comprises alumina.

23. The process of claim 21 where the diffusion barrier comprises zirconia.

24. The process of claim 23 where only a portion of the longitudinal passageways comprise palladium.

25. The process of claim 21 where the palladium catalyst additionally comprises one or more adjunct catalyst metals selected from silver, gold, platinum, ruthenium, rhodium, iridium, or osmium.

26. The process of claim 25 where the adjunct catalyst is silver or platinum.

27. The process of claim 21 where the combustible gas mixture is preheated to a temperature of more than approximately 325° C. prior to passage into the combustion zone.

28. The process of claim 21 where only a portion of the surfaces of the longitudinal passageways comprise palladium.

29. The process of claim 28 where the portion of the surfaces of the longitudinal passageway surfaces containing palladium are adjacent to passageway surfaces not containing palladium and those surfaces are in integral heat exchange relationship to each other.

30. The process of claim 21 where a portion of the catalyst support first contacting the combustible gas mixture comprises a higher activity palladium catalyst.

* * * * *